United States Patent [19]
Nishihiro et al.

[11] Patent Number: 4,739,464
[45] Date of Patent: Apr. 19, 1988

[54] DIRECT CURRENT MAGNETIC POLARIZATION COMPONENT COMPENSATION CIRCUIT FOR CONSTANT VOLTAGE/FREQUENCY POWER SUPPLY APPARATUS

[75] Inventors: Akinori Nishihiro; Ikutaro Hanaka; Takeyoshi Kajita, all of Aichi, Japan

[73] Assignee: Mitsubishi Denki Kabushiki Kaisha, Tokyo, Japan

[21] Appl. No.: 920,363

[22] Filed: Oct. 20, 1986

[30] Foreign Application Priority Data

Oct. 21, 1985 [JP] Japan ............................ 60-234953
Oct. 21, 1985 [JP] Japan ............................ 60-234955

[51] Int. Cl.$^4$ ................................................ H02M 5/458
[52] U.S. Cl. .................................. 363/37; 363/41; 363/56
[58] Field of Search .................... 363/37, 41, 56; 318/802, 803, 811; 307/64

[56] References Cited

U.S. PATENT DOCUMENTS 3,697,855 10/1972 Kernich et al. ..................... 363/41
4,133,025  1/1979 Wurzburg ........................... 363/41
4,506,766  3/1985 Watanabe ........................... 307/64
4,553,198 11/1985 Chan et al. .......................... 363/56

Primary Examiner—William H. Beha, Jr.
Attorney, Agent, or Firm—Bernard, Rothwell & Brown

[57] ABSTRACT

The present invention is directed to supply an AC (alternating current) output having a constant voltage and a constant frequency to a load such as computers. A constant voltage/frequency power supply apparatus is provided which comprises at least a constant voltage/frequency output circuit including a converter, connected between an AC power source and the load, for DC-converting the AC output of this power source, and an inverter for AC-inverting the DC-converted output, a control circuit for controlling the inverter of the output circuit, and further a correction means for deleting as a DC magnetic polarization amount a DC component contained in the AC output of the output circuit, and for deleting a DC magnetic polarization amount from the AC output supplied to the load, based upon the detected DC magnetic polarization amount, whereby a sine wave AC output having a constant voltage/frequency which is not adversely influenced by the DC magnetic polarization is supplied to the load.

5 Claims, 8 Drawing Sheets

DIRECT CURRENT MAGNETIC POLARIZATION COMPONENT COMPENSATION CIRCUIT FOR CONSTANT VOLTAGE/FREQUENCY POWER SUPPLY APPARATUS

BACKGROUND OF THE INVENTION

1. Field of the Invention

The present invention relates to a constant voltage/frequency power supply apparatus capable of continuously applying a constant voltage having a constant frequency to a load.

2. Description of the Prior Art

In general, a constant voltage/frequency power supply apparatus is used to apply a constant voltage having a constant frequency to loads such as devices and appliances that are required to be continuously driven in a constant condition.

In FIG. 1, there is shown a block diagram of one conventional constant voltage/frequency power supply apparatus. Reference numeral 1 indicates an AC (alternating current) power supply, reference numeral 2 denotes a transformer for transforming an output voltage of the AC power supply 1, reference numeral 3 represents a constant voltage/frequency output circuit (referred to as "a CVCF circuit") to obtain a constant voltage having a constant frequency by processing the output voltage of the transformer 2, and reference numeral 4 denotes another transformer for transforming the constant voltage/frequency output derived from the CVCF circuit 3 so as to supply the transformed constant voltage/frequency output to a load 5. The above-described CVCF circuit 3 includes a converter 31 for converting the AC output supplied from the AC power supply 1 via the transformer 2 into a DC (direct current) output, an inverter 32 for inverting the DC output of the converter 31 into a corresponding AC output, and an AC filter 33 for filtering the AC output inverted by the inverter 32. The AC inverter 32 is connected to a control circuit 6.

The above-mentioned CVCF circuit 3 is illustrated in FIG. 2, more particularly. In FIG. 2, the converter 31 is composed of a bridge circuit made up of four diodes 311-314 and an electrolytic capacitor 315. The inverter 32 consists of four transistors 321-324, each connected with the control circuit 6 which outputs the signal controlling the inverter 32 for forming a square wave including output frequency components between points A and B by turning transistors on or off. The AC filter 33 is made up of a reactor 331 and a capacitor 332.

With this circuit arrangement, the AC output derived from the AC power supply 1 is transformed to a predetermined AC voltage by the transformer 2, and then this AC voltage is input to the CVCF circuit 3. Upon receipt of this AC voltage in the CVCF circuit 3, it is converted into the DC voltage by the converter 31, the DC output is inverted into the AC output by the inverter 32 which is conducting-controlled by control signals of the control circuit 6. Thereafter, the inverted AC output is filtered by the AC filter 33 to derive only a desirable frequency component therefrom, which is then transformed by the transformer 4 to produce a desired AC voltage. The resultant AC voltage is a constant AC voltage having a constant frequency, which is to be applied to the load 5.

Another prior art constant voltage/frequency power supply apparatus is shown in FIG. 3, the circuit arrangement as well as the operation of which are different from those of the power supply apparatus shown in FIG. 1. It should be noted that reference numerals 1 through 6 and 31 to 33 shown in FIG. 3 denote the same circuit elements shown in FIG. 1. In the circuit of FIG. 3, a changeover circuit 7 is interposed between the CVCF circuit 3 and the transformer 4, and a direct voltage-applying circuit 8 is connected to a junction between the transformer 2 and the CVCF circuit 3, and the changeover circuit 7. The changeover circuit 7 is composed of a contactor, a thyristor, or a transistor.

A description will now be made of the operation of the circuit arrangement shown in FIG. 3. As the operation of the CVCF circuit 3 including the control circuit 6 is the same as that of FIG. 1, the constant AC voltage having a constant frequency can be applied to the load 5. When such a constant AC voltage having a constant frequency is not required for the load 5, or when an accident occurs in the CVCF circuit 3 in case of providing such a constant AC voltage having a constant frequency, the AC output transformed by the transformer 2 may be supplied directly to the load 5 via the direct voltage-applying circuit 8 by changing the changeover circuit 7 such as AC switches, as illustrated in FIG. 3.

The above-described conventional constant voltage/frequency power supply apparatus, however, contain the following drawbacks.

First, since the output voltage of the CVCF circuit 3 appears as a sine wave, a so-called "drift" phenomenon occurs due to changes in the control element characteristics by the aging and the temperature variations, and commands on the reference sine wave are changed, then DC magnetic polarization is produced by superimposing a DC component on the AC output. If the DC magnetic polarization occurs in the power supply apparatus, the transformer 4 connected to the output stage of the CVCF circuit 3 is excited by this DC component. As a result, the DC current flows through the primary coil of the transformer 4, resulting in an increase of the temperature, which causes the transformer to be burned out.

Secondly, if the circuit elements of the inverter 32 in the CVCF circuit 3 are broken down due to certain reasons, the polarity of the DC voltage accidentally appears as a single polarity. The conventional power supply apparatus, however, cannot detect such a breakdown accident instantaneously.

SUMMARY OF THE INVENTION

The present invention is made by solving the above-identified problems, and therefore has an object to provide a constant voltage/frequency power supply apparatus in which a temperature increase as well as burnout of a transformer can be avoided by deleting the DC current component from the transformer exciting current, while the DC magnetic polarization is automatically cancelled.

Another object of the invention is to provide a constant voltage/frequency power supply apparatus for simultaneously detecting malfunction which may be caused by the circuit elements of the inverter and the like upon occurrence of the DC magnetic polarization.

To achieve the above objects of the invention, the constant voltage/frequency power supply apparatus according to invention is characterized in that correcting command means is provided for detecting a volume, or amount, of the DC magnetic polarization contained in the AC output of the CVCF circuit and for controlling the operation of the CVCF circuit based upon the detected volume of the DC magnetic polarization, the AC output having a constant level and a constant frequency being continuously supplied to the load by the correcting command means.

BRIEF DESCRIPTION OF THE DRAWINGS

The advantages and features of the disclosed invention will readily be appreciated by persons skilled in the art from the following detailed description when read in conjunction with the drawing, in which.

DETAILED DESCRIPTION OF THE PREFERRED EMBODIMENTS

A detailed description will now be made of preferred embodiments concerning a constant voltage/frequency power supply apparatus according to the present invention with reference to the drawings.

ARRANGEMENT OF FIRST POWER SUPPLY APPARATUS

Figure 4:
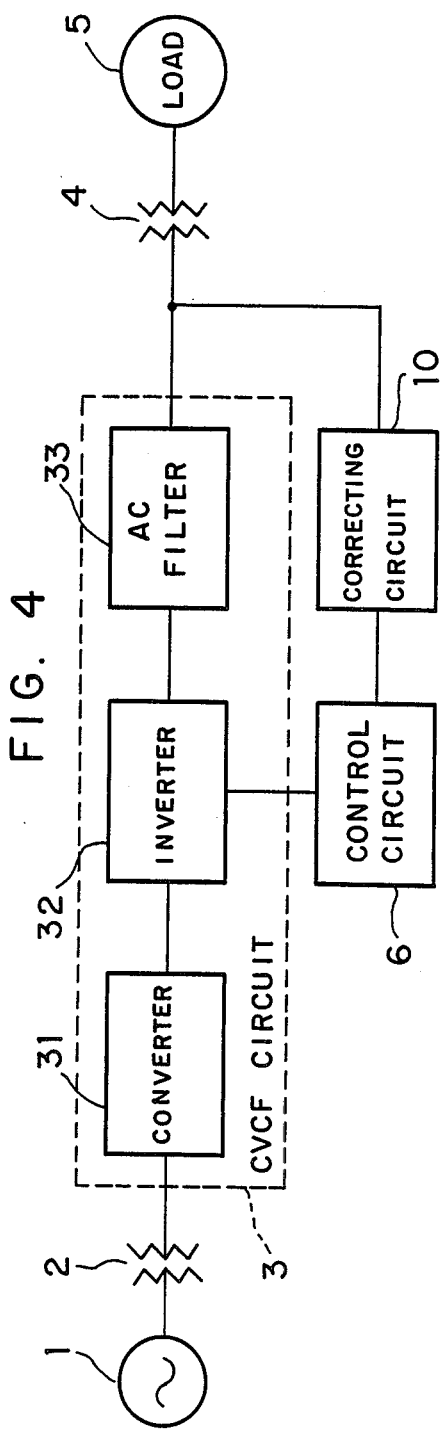
FIG. 4 is a block diagram of a constant voltage/frequency apparatus according to a first preferred embodiment.
Figure 5:
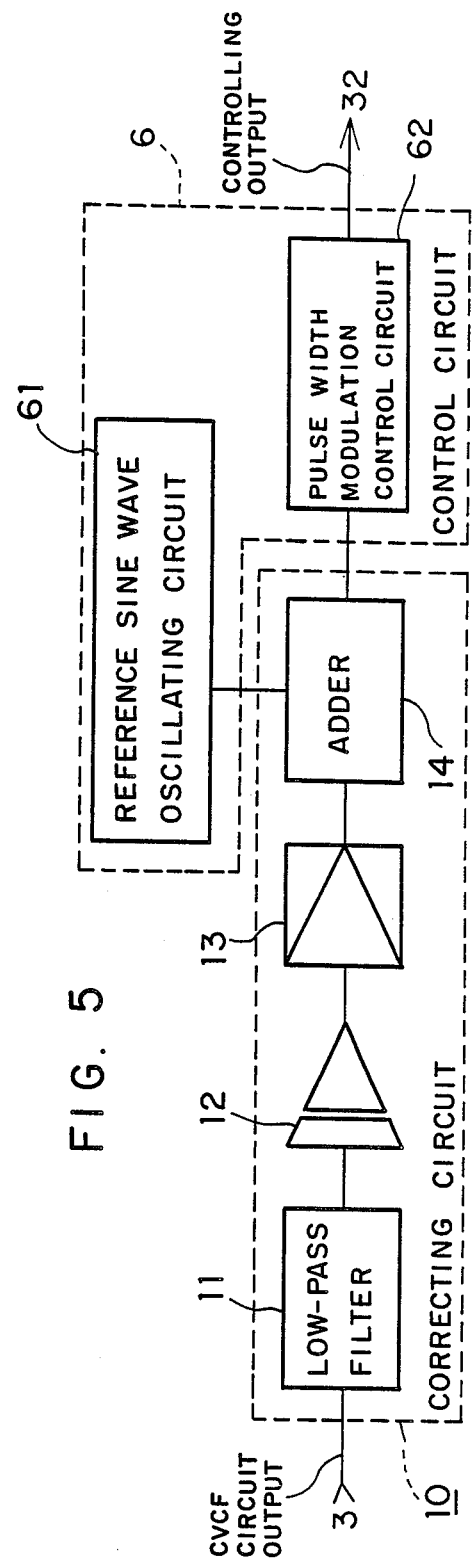
FIG. 5 is a block diagram of a correcting circuit in the constant voltage/frequency apparatus shown in FIG. 4.
Figure 6:
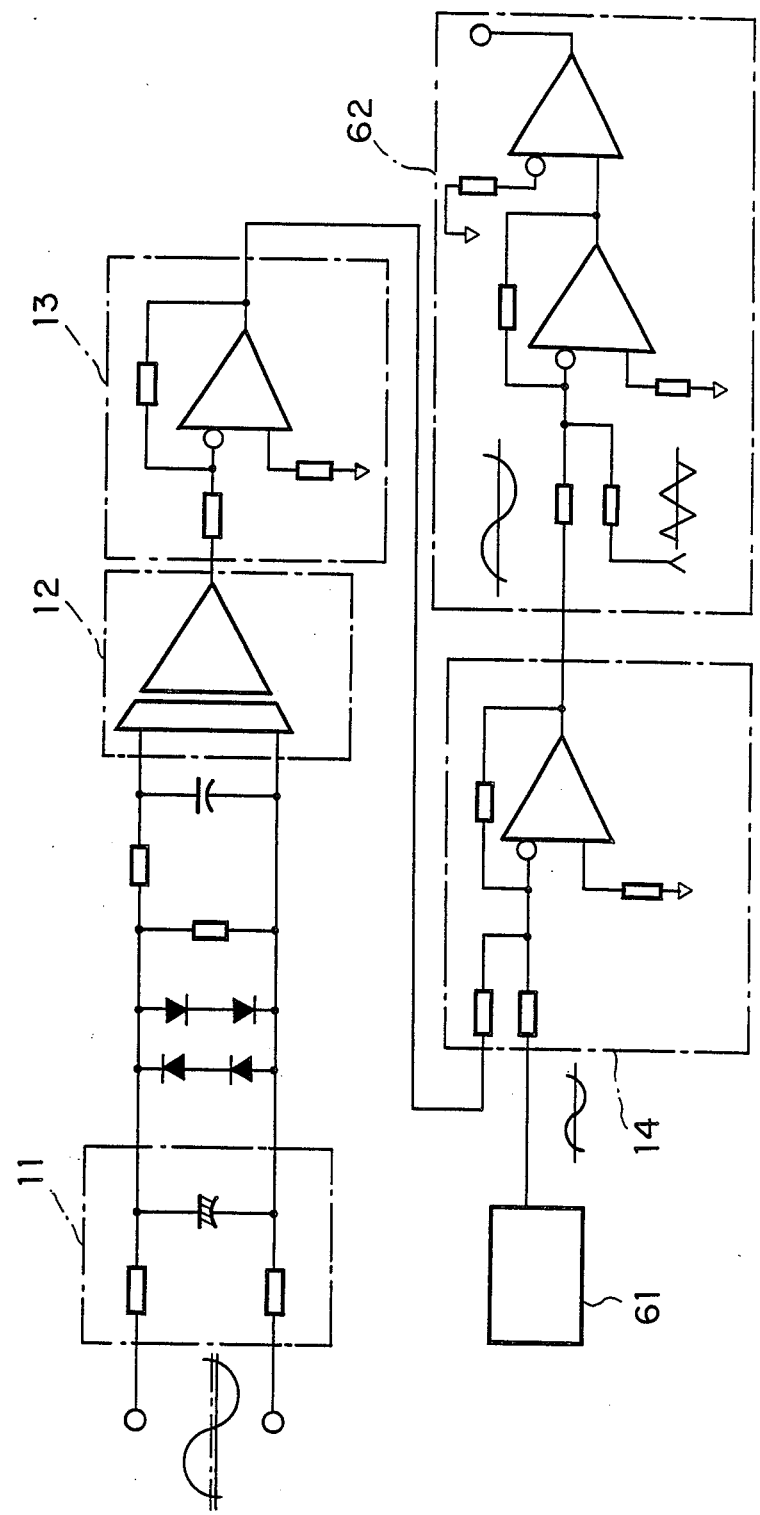
FIG. 6 is a circuit diagram in detail of the correcting circuit 10 in FIG. 5.

A circuit arrangement according to the first preferred embodiment of the invention will be first described, referring to FIG. 4. No further description is made in the specification of the elements designated by, reference numerals 1 to 6 and 31 through 33 since these elements are the same circuits as those of FIG. 1 designated by the same numerals. A correcting circuit 10 is connected between the control circuit 6 for controlling the inverter 32 constituting the CVCF circuit 3 (shown in FIG. 2) and a junction between the CVCF circuit 3 and the transformer 4. The control circuit 6 and the correcting circuit 10 are shown in FIG. 5, and details of them are shown in FIG. 6. In the circuit shown in FIGS. 5, 6, the correcting circuit 10 includes a low pass filter 11 for deriving only the DC component from the output voltage having, e.g., a frequency of 60 Hz of the CVCF circuit 3, an isolation amplifying circuit 12 for applying the DC voltage obtained in the low pass filter 11 to the control circuit side through a limiter and a noise filter (not shown in FIG. 5) and for isolating the CVCF circuit side and the control circuit side, and an amplifying circuit 13 for producing a predetermined volume, or amount, of correction for the DC magnetic polarization. The correcting circuit 10 further includes an adder 14 for adding the correction volume of the DC magnetic polarization derived from the amplifying circuit 13 to a reference sine wave produced from a reference sine wave oscillating circuit 61 of the control circuit 6. The control circuit 6 includes a pulse width modulation control circuit 62, in addition to the above reference sine wave oscillating circuit 61, for modulating the pulse width of the output of the adder 14 so as to produce a control signal to the inverter 32.

OVERALL OPERATION

Referring to the circuits shown in FIGS. 4, 5 and 6, an overall operation of the constant voltage/frequency power supply apparatus according to the first preferred embodiment will be described.

The output voltage of the CVCF circuit 3 is input to the low pass filter 11 so as to derive the DC component only, and thereafter the DC component is supplied via the isolation amplifying circuit 12 to the amplifying circuit 13. A predetermined correction amount of the DC magnetic polarization can be determined by this amplifying circuit 13, and the correction amount is summed with the reference sine wave in the adder 14. The reference sine wave is output from the reference sine wave oscillating circuit 61 in the control circuit 6, and is added to the correction amount of the DC magnetic polarization for the correction purposes. Thereafter it is pulse-width-modulated as the control signal in the pulse width modulation control circuit 62 of the control circuit 6, and supplied to the inverter 32 of the CVCF circuit 3.

AMOUNT OF DC MAGNETIC POLARIZATION

Figure 7:
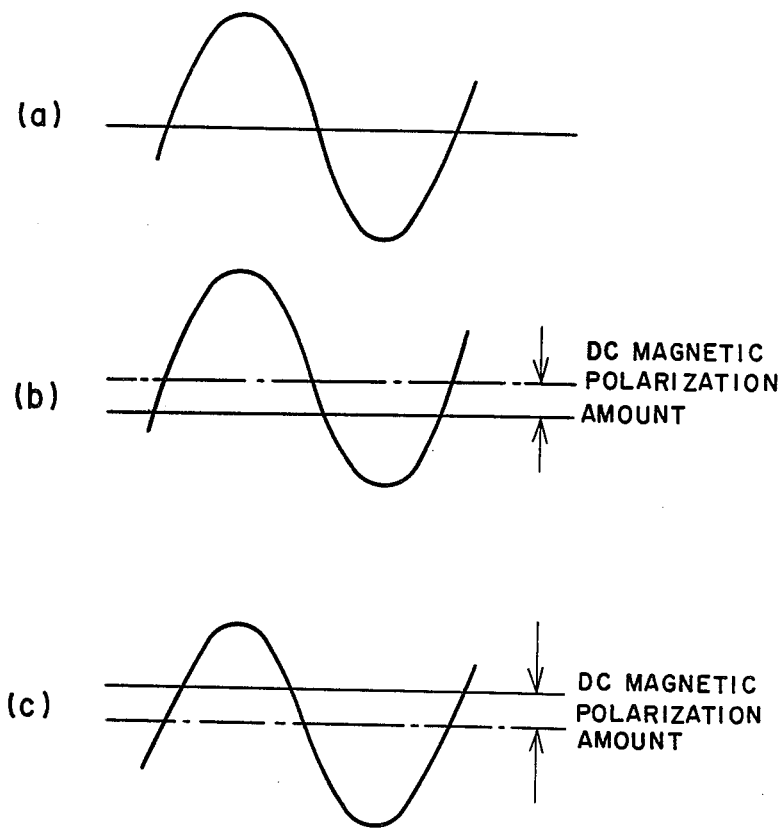
FIGS. 7(a)–7(c) show output waveforms of the CVCF circuit shown in FIGS. 4–6.

The output voltages of the CVCF circuit 3 are represented in FIG. 7. FIG. 7(a) shows a normal output voltage influenced by no DC magnetic polarization. FIG. 7(b) shows an output voltage adversely influenced by the DC magnetic polarization in a positive direction. FIG. 7(c) shows an output voltage adversely influenced by the DC magnetic polarization in a negative direction.

Figure 8:
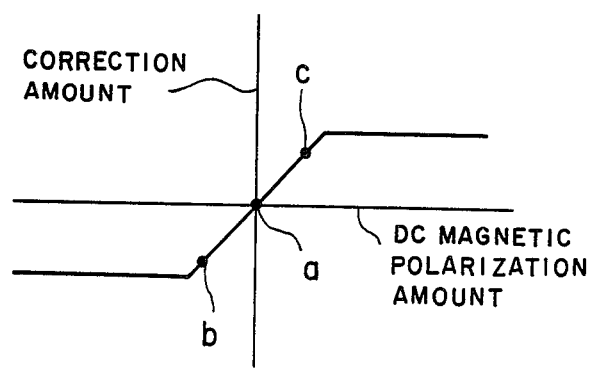
FIG. 8 illustrates a relationship between a correction amount and an amount of the DC magnetic polarization of the AC output according to the preferred embodiment shown in FIGS. 4–6.

FIG. 8 shows a relationship between the correction amount and the amount of the DC magnetic polarization, in which the abscissa denotes the amount, or volume, of the DC magnetic polarization, whereas the ordinate represents the correction amount. In FIG. 8, points a to c correspond to the amounts of the DC magnetic polarization as illustrated in FIGS. 7(a) to 7(c).

Accordingly, even if the initial setting of the reference sine wave is performed under the condition of the temperature drift and the aging effect, the CVCF circuit 3 can derive the output voltage within a range between 0.1 and 0.5 percent of the DC magnetic polarization amount.

ARRANGEMENT OF SECOND POWER SUPPLY APPARATUS

A power supply apparatus according to a second preferred embodiment will now be described with reference to FIGS. 9 and 10.

Figure 1:
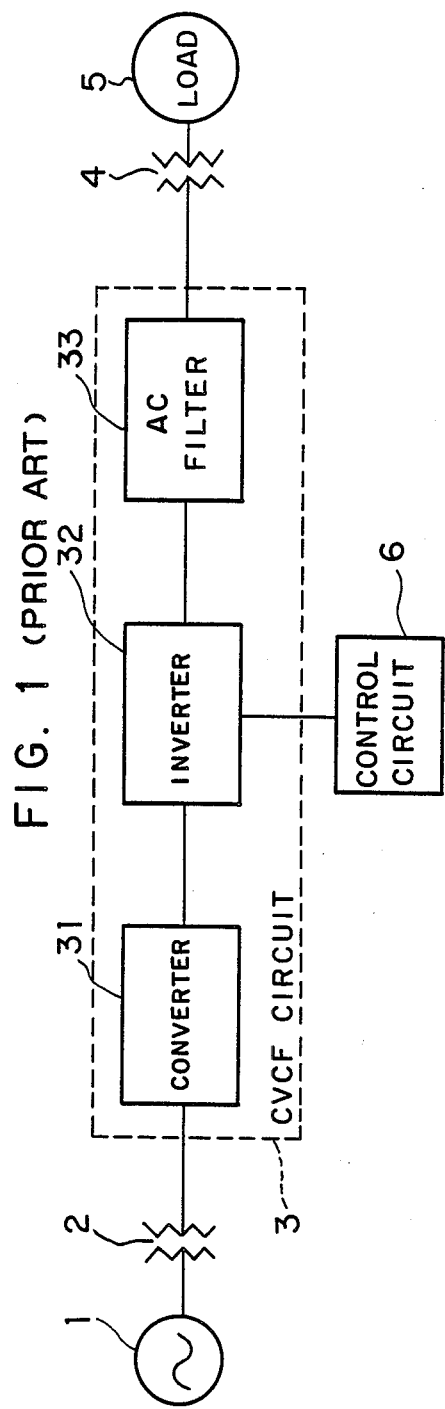
FIG. 1 is a block diagram of one conventional constant voltage/frequency power supply apparatus.
Figure 3:
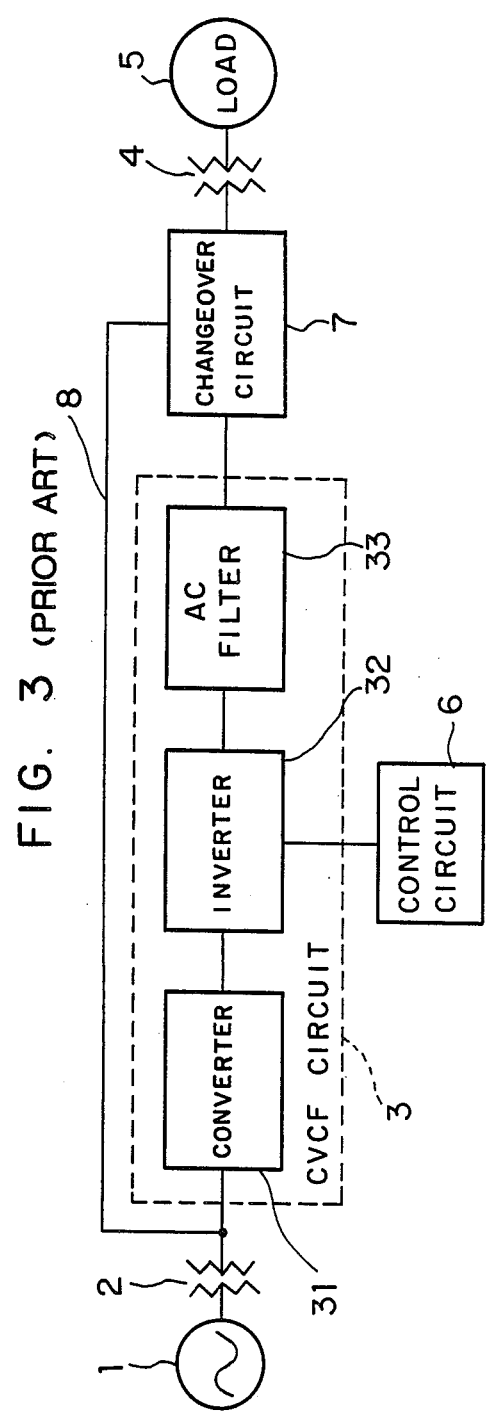
FIG. 3 is a block diagram of another conventional constant voltage/frequency power supply apparatus different from the power supply apparatus shown in FIG. 1.
Figure 2:
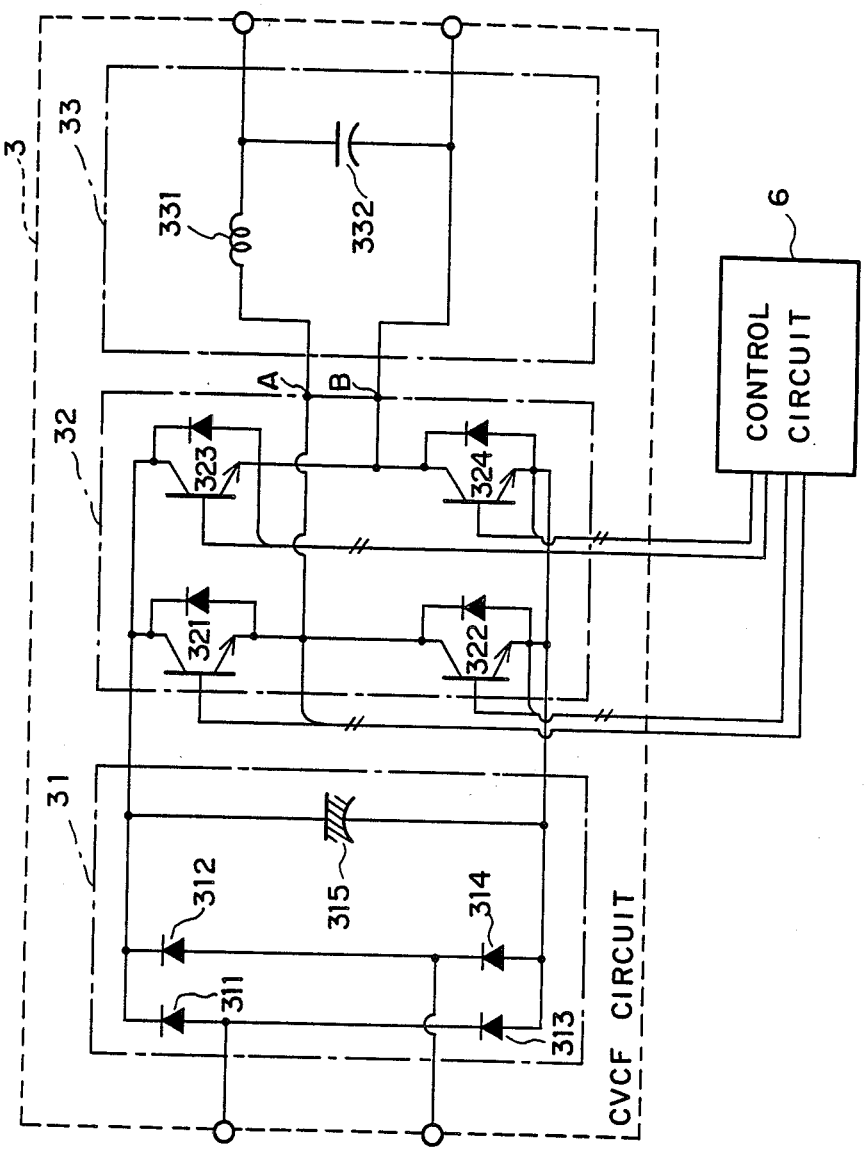
FIG. 2 is a circuit diagram of the CVCF circuit shown in FIG. 1.
Figure 9:
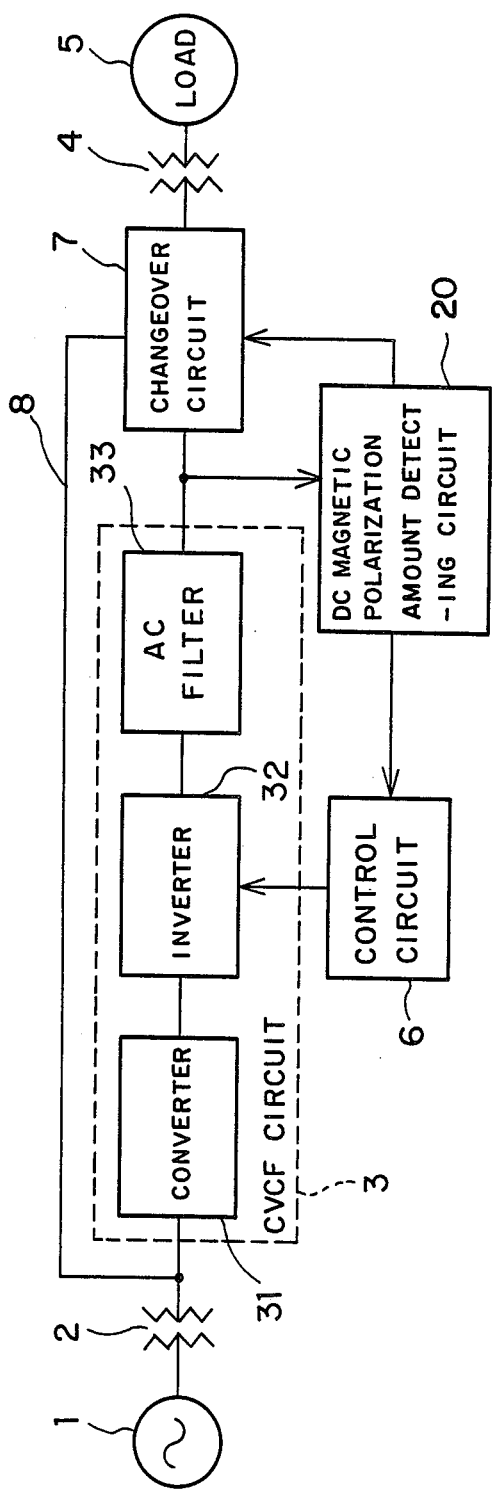
FIG. 9 is a block diagram of a constant voltage/frequency power supply apparatus according to a second preferred embodiment.

FIG. 9 shows a block diagram of the power supply apparatus according to the second preferred embodiment, in which reference numerals 1 through 8 and 31 to 33 represent the same circuit components as shown in FIG. 1 and 3, and the CVCF circuit has the same constitution as that shown in FIG. 2. Reference numeral 20 indicates a detecting circuit for detecting the DC magnetic polarization volume, or amount, contained in the AC output of the CVCF circuit 3, and is connected to the control circuit 6 and the changeover circuit 7.

Figure 10:
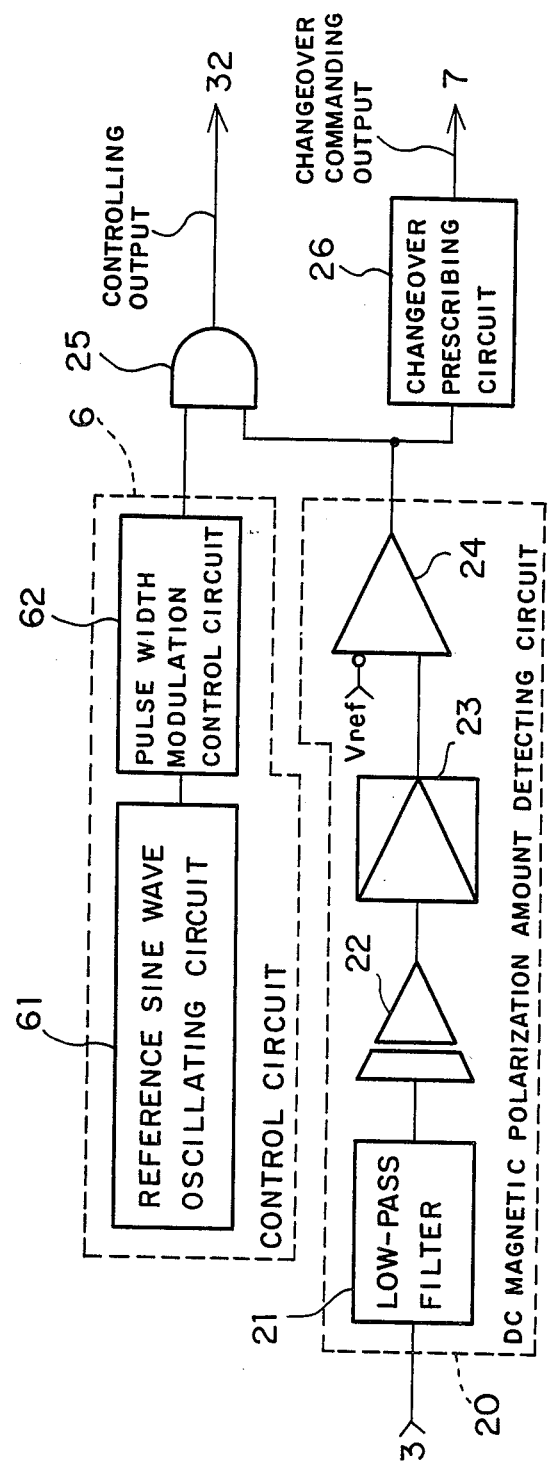
FIG. 10 is a block diagram of details of a detecting circuit for a DC magnetic polarization volume shown in FIG. 9.
Figure 11:
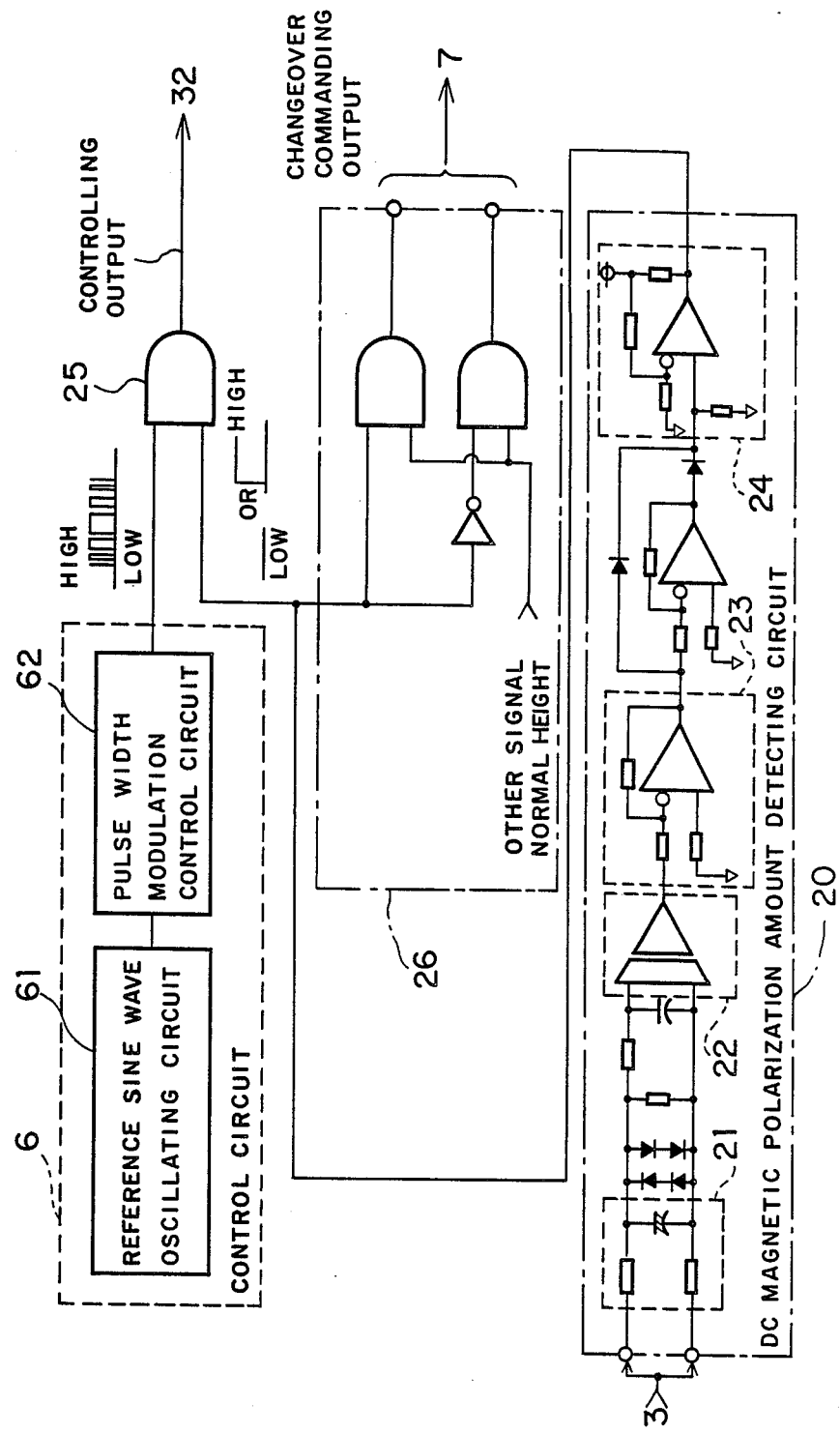
FIG. 11 is a circuit diagram in detail of the DC magnetic polarization amount detecting circuit in FIG. 10.

A detailed arrangement of the DC magnetic polarization amount detecting circuit 20 includes, as shown in FIG. 10, a low pass filter 21 for deriving only the DC component from the output voltage of the CVCF circuit 3, an isolation amplifying circuit 22 for isolating the CVCF circuit side from the control circuit side to feed the DC voltage obtained in the low pass filter 21, an amplifying circuit 23 for detecting the amount of the DC magnetic polarization, and a comparator 24 for comparing the DC magnetic polarization amount with a predetermined reference amount of DC magnetic polarization Vref. And the DC magnetic polarization amount detecting circuit 20 is minutely illustrated in FIG. 11.

OVERALL OPERATION

The overall operation of the second power supply apparatus is as follows. The output voltage of the CVCF circuit 3 is applied to the low pass filter 21 to derive only the DC component, and then this DC component is supplied to the amplifying circuit 23 via the isolation amplifying circuit 22. The amplifying circuit 23 enables an amount, or volume, of the DC magnetic polarization to be determined. The comparator 24 compares this DC magnetic polarization amount to the predetermined reference amount Vref.

When the DC magnetic polarization amount is lower than the given reference amount Vref, the output of the comparator 24 becomes a high level. An AND gate 25 receiving this high level output passes the control signal from the control circuit 6. Also a changeover prescribing circuit 26 receives the high level output and changes the AC switch of the changeover circuit 7 to the CVCF circuit side.

Under this condition, when the DC magnetic polarization amount contained in the output voltage of the CVCF circuit 3 exceeds the predetermined reference amount Vref, the output of the comparator 24 goes to a low level and therefore the AND gate 25 changes its state to output no control signal at its output terminal. Then, the inverter 32, i.e., the CVCF circuit 3 is interrupted. Simultaneously, the changeover prescribing circuit 24 to which the low level output of the comparator 24 is supplied changes the AC switch of the changeover circuit 7 to the direct voltage-applying circuit 8, thereby feeding the AC voltage via the direct voltage-applying circuit 8 to the load 5 under the normal condition.

ADVANTAGES

While the present invention has been described in detail by using specific embodiments, the following advantages of the constant voltage/frequency power supply apparatus can be achieved by continuously controlling the power output to be supplied to the load, based upon the DC magnetic polarization amount contained in the AC output of the CVCF circuit.

First, the constant voltage/frequency power supply apparatus can be provided in which the DC excitation of the transformer provided at the load side of the CVCF circuit can be avoided due to an increase of the DC magnetic polarization amount contained in the AC output of the CVCF circuit, resulting in no breakdown of the appliances such as the transformer and heavy duty operations.

Moreover, the constant voltage/frequency power supply apparatus can be accomplished in that since the DC magnetic polarization amount contained in the AC output of the CVCF circuit is detected by the correction controlling means so as to control the output of the CVCF circuit, the malfunction of the circuit elements of the inverter and the like which may cause occurrence of the DC magnetic polarization can be instantaneously detected to realize the firm maintenance and inspection.

What is claimed is:

1. A constant voltage/frequency power supply circuit comprising:

a constant voltage/frequency output circuit including a converter for DC-converting an AC output of a power source, and an inverter for AC-inverting the DC converted output to be supplied to a load;

a direct voltage/applying circuit for directly applying the AC output of the power source to said load;

changeover means for selectively changing from said constant voltage/frequency output circuit to said direct voltage-applying circuit; and a control circuit for outputting a control signal to said inverter; and a DC magnetic polarization amount detecting circuit, connected to a junction between said constant voltage/frequency output circuit and said changeover means, to said control circuit and to said changeover means, for detecting the DC magnetic polarization amount contained in the AC output of said constant voltage/frequency output circuit, for actuating said changeover means so as to change the circuit to said direct voltage-applying circuit when said DC magnetic polarization amount exceeds a predetermined reference amount, and for simultaneously stopping delivery of said control signal from said control circuit.

2. A circuit as claimed in claim 1, wherein transformers each are connected between said AC power source and said control voltage/frequency output circuit, and between said changeover means and said load, respectively.

3. A circuit as claimed in claim 1, wherein said DC magnetic polarization amount detecting circuit includes:

a filter for deriving only a DC component from the AC output of said constant voltage/frequency output circuit;

an amplifying circuit for detecting the DC magnetic polarization amount based upon the filter output and for modulating the same to be output; and a comparison circuit for judging whether said DC magnetic polarization amount exceeds the predetermined reference amount upon receipt of said DC magnetic polarization amount derived from said amplifying circuit, and for supplying a command output to said changeover means and said control means respectively when said DC magnetic polarization amount exceeds the predetermined reference amount.

4. A circuit as claimed in claim 1, wherein said control circuit includes at least:

a reference sine wave output circuit for outputting the reference sine wave to be derived from said inverter; and a pulse width modulation control circuit for pulse-width-modulating said reference sine wave.

5. A circuit as claimed in claim 1, further comprising;

an AND gate for AND-gating the detected output of said comparison circuit in said DC magnetic polarization detecting circuit and the control output from said control circuit so as to output the control signal to said inverter, and a changeover prescribing circuit for outputting a changeover command to said changeover means based upon the detected output of said comparison circuit.

* * * * *